United States Patent [19]
Zechmann et al.

[11] Patent Number: 6,056,373
[45] Date of Patent: *May 2, 2000

[54] SYSTEM FOR CONTROLLING THE BRAKING ACTION IN A MOTOR VEHICLE

[75] Inventors: Juergen Zechmann, Heilbronn; Albrecht Irion, Stuttgart, both of Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/878,701

[22] Filed: Jun. 19, 1997

[30] Foreign Application Priority Data

Jun. 28, 1996 [DE] Germany .............. 196 25 919

[51] Int. Cl.⁷ .................................................. B60T 8/32
[52] U.S. Cl. .......................... 303/191; 188/353; 303/3; 303/89
[58] Field of Search ...................... 303/139, 176, 303/192, 191, DIG. 6, 3, 89, 116.1, 193, 125, 135, 113.3, 2; 180/197, 287; 477/195, 196, 194, 197, 92, 94, 71, 901, 116, 93; 701/54; 188/353; 192/4 A

[56] References Cited

U.S. PATENT DOCUMENTS

| | | | |
|---|---|---|---|
| 3,645,352 | 2/1972 | Stark et al. | 303/192 |
| 4,515,259 | 5/1985 | Ha | 188/353 |
| 4,681,196 | 7/1987 | Fulmer et al. | 303/91 |
| 4,971,400 | 11/1990 | Jonner | 180/197 |
| 5,484,044 | 1/1996 | Bursteinas et al. | 188/353 |
| 5,779,328 | 7/1998 | Mergenthaler et al. | 303/116.1 |

FOREIGN PATENT DOCUMENTS

| | | | |
|---|---|---|---|
| 61-119458 | 6/1986 | Japan | 188/353 |
| 61-253252 | 11/1986 | Japan | 188/353 |
| 61-295162 | 12/1986 | Japan | 188/353 |
| 62-55248 | 3/1987 | Japan | 188/353 |
| 62-80147 | 4/1987 | Japan | 188/353 |
| 62-275864 | 11/1987 | Japan | 188/353 |
| 63263157 | 10/1988 | Japan | 188/353 |
| 130861 | 2/1989 | Japan | 303/191 |
| 152561 | 2/1989 | Japan | 188/353 |
| 170251 | 3/1989 | Japan | 188/353 |
| 1306352 | 12/1989 | Japan | 188/353 |
| 260864 | 3/1990 | Japan | 188/353 |

*Primary Examiner*—Douglas C. Butler
*Attorney, Agent, or Firm*—Fulbright & Jaworski, LLP

[57] ABSTRACT

The invention is based on a system for controlling the braking action in a motor vehicle by means for adjusting the braking action independently of the driver's actuation. Upon recognition of a preselectable operating mode, for which at least the longitudinal velocity of the vehicle is found to be zero, a certain braking action is exerted. An operating mode of the type in question can be present when, for example, the above-mentioned creep suppression or the above-mentioned hillholding is desired. The core of the invention consists in that, upon determination of a preselectable longitudinal vehicle velocity during this operating mode, the braking action is increased independently of the driver. As a result of the monitoring of the longitudinal vehicle velocity according to the invention during the operating mode (creep suppression mode or hillholder mode), any motion of the vehicle unwanted by the driver is reliably prevented.

14 Claims, 3 Drawing Sheets

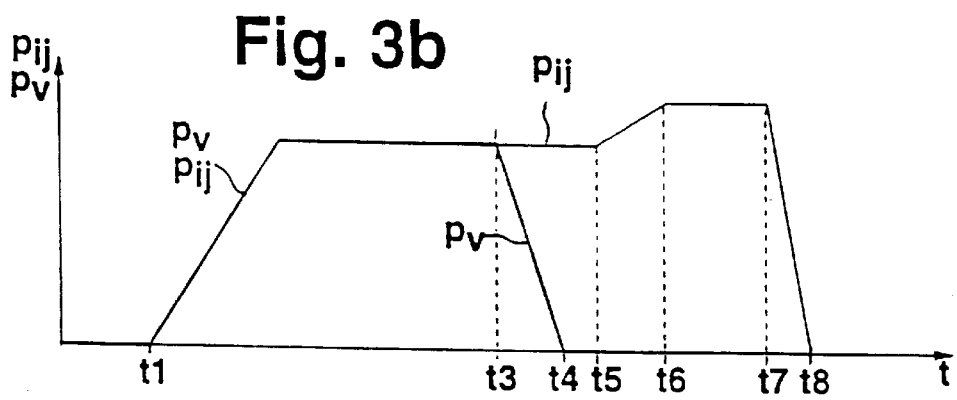
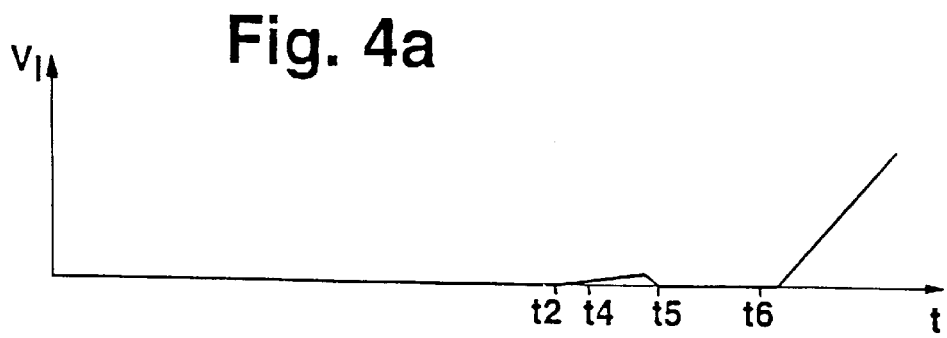
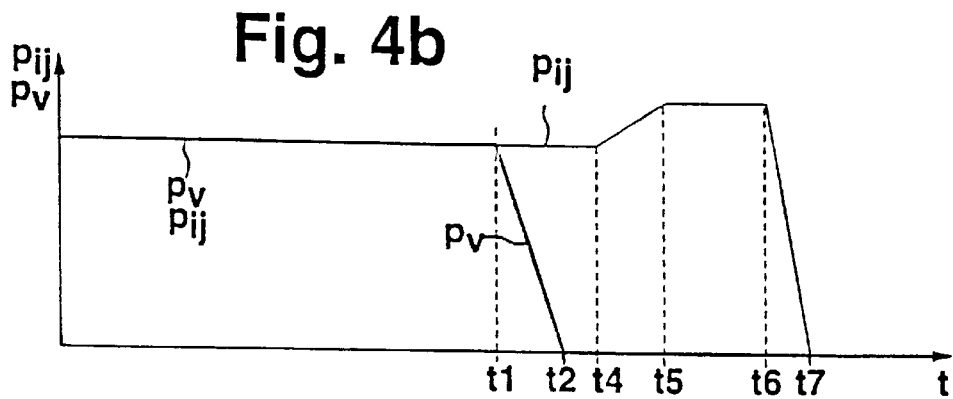

SYSTEM FOR CONTROLLING THE BRAKING ACTION IN A MOTOR VEHICLE

STATE OF THE ART

The system according to the invention is based on a system for controlling the braking action in a motor vehicle.

When a vehicle with an automatic transmission is brought to a stop, it is well known that the driver must use the brake to keep it stopped, because, when a driving range is engaged, i.e., the transmission is in drive, the converter tends to make the vehicle move slowly forward (to "creep"). The driver can be relieved of this burden if the necessary braking action, usually the braking pressure, is kept essentially constant once it has been applied. This can be done, for example, by means of a valve between the master brake cylinder and the wheel brake cylinder in the wheel, this valve being used to lock in the braking pressure first applied by the driver as soon as the vehicle has come to a stop. For this purpose, a vehicle velocity sensor recognizes the stopped status of the vehicle. The driver can then lift his foot off the brake pedal as the wheels continue to be braked. The braking pressure in the wheels is released as soon as the driver actuates the gas pedal and thus signals his desire to start moving again. A system such as this for suppressing creep can be derived from, for example, DE-OS 43 32 459.

Getting a vehicle with a manual transmission started up on a hill is a complicated process, which requires the combined use of the gas pedal and the clutch pedal in cooperation with the actuation of the hand brake. The difficulty consists in supplying just enough braking action or braking torque during the starting process to prevent the vehicle from starting to roll in the wrong direction until the drive torque being transmitted via the manual transmission is strong enough to get the vehicle actually moving forward. There have been many proposals for ways to simplify the work required of the driver in this situation. In vehicles with hydraulic brake systems, for example, the wheel brake pressure can be separated from the master brake cylinder pressure by a control valve. Once the brake pressure has been applied by the driver, it remains acting at the wheels, even after the driver has stopped actuating the brake pedal. This process is activated by a special switch. The driver can now initiate the startup process without having to worry about the brake. The control valve is opened as soon as it has been recognized on the basis of a change in the rotational position of the drive shaft that the vehicle has started to move. Reference can be made to, for example, DE-OS 38 32 025 (cor- responding to U.S. Pat. No. 4,971,400) for startup aids such as this ("hillholders").

In the above-mentioned systems for suppressing creep or for aiding the startup process, however, it can occur that the vehicle nevertheless starts to move in certain situations not intended by the driver.

The task of the present invention consists in creating a system such that vehicle motion unwanted by the driver is suppressed in all operating situations.

This object is accomplished by the invention claimed herein.

ADVANTAGES OF THE INVENTION

As mentioned, the invention is based on a system for controlling the braking action in a motor vehicle with means for adjusting the braking action independently of actuation by the driver. A certain braking action is applied in response to the recognition of a preselectable operating mode, in which at least the longitudinal velocity of the vehicle has been found to be zero. An operating mode of this kind can be present when, for example, the above-mentioned creep suppression or the above-mentioned hillholder function is desired.

In the invention, while this operating mode is in effect, the braking action is increased independently of the driver when a preselectable longitudinal vehicle velocity has been determined. Because, according to the invention, the longitudinal velocity of the vehicle is kept under observation during the operating mode (creep suppression mode or hillholder mode) and because, according to the invention, the braking action is increased, any motion of the vehicle unwanted by the driver is suppressed.

It is provided in particular in accordance with the invention that, to sense the conditions required for the activation of the operating mode (creep suppression mode or hillholder mode), the only signals used are those which are present in any case in a vehicle which already has an antilock/drive slip/driving dynamics control system (ABS/ASR/FDR). The creep suppression function or the hillholder function can thus be integrated into an ABS/ASR/FDR system without the need for any additional sensors. After creep suppression or hillholding has been activated, the braking action (the brake pressure in the case of a hydraulic brake system) is increased automatically if the braking action initially applied by the driver is not sufficient to keep the vehicle at a standstill.

Even after creep suppression or hillholding has been activated, it is still possible for the vehicle to undergo unwanted motion if there are leaks in the hydraulic system or if the load being carried by the vehicle has been increased.

In an advantageous embodiment of the invention, it is provided that the operating mode is recognized when, in addition to the finding that the longitudinal velocity of the vehicle is zero, it is also determined that a switch which can be actuated by the driver of the vehicle is in a preselect able position. This is meaningful in the case of hillholding.

In the case of creep suppression, the vehicle has a transmission which changes its gear ratios automatically (automatic transmission) and which has at least one driving range. In this case, it can be provided that the operating mode is recognized when, in addition to the finding that the longitudinal velocity of the vehicle is zero, it is also determined that the driving range is engaged. If the automatic transmission is in a neutral position, creep suppression is not initiated, because the vehicle generally does not have the tendency to creep in neutral.

In another embodiment, it can be provided that the operating mode is recognized when the braking action initiated by the driver exceeds a preselectable first value. In the case of a hydraulic brake system, the braking action initiated by the driver is determined by the braking pressure at the master brake cylinder, the so-called input pressure. Especially in systems in which the input pressure is known (e.g., in brake systems with pressure sensors), the input pressure will therefore also be used according to the invention as one of the activation conditions for creep suppression or hillholding.

As already mentioned, it can be provided that the means according to the invention are designed in such a way that, in response to the recognition of the preselectable operating mode, the braking action specified by the driver at this time is held essentially constant.

As an alternative, however, it can also be provided that the means according to the invention are designed so that, upon recognition of the preselectable operating mode, the braking action specified at this time by the driver is increased by a preselectable value. This variant of the invention increases the reliability even more in that, in a hydraulic brake system, for example, the wheel brake pressure is increased beyond the value initially applied by the driver (safety pressure offset).

According to the invention, the operating mode (creep suppression or hillholding) can be exited when it is recognized that a variable representing the engine torque and/or the driver's desire to drive on exceeds a preselectable third value. For this purpose, the engine torque received from the engine control unit can be evaluated directly, or the position of the gas pedal can be determined.

If, as mentioned above, the input pressure, as the value representing the braking action initiated by the driver, is known, it can be provided that the operating mode is exited when it is recognized that the input pressure is below a preselectable value.

If the input pressure is known, the braking action in effect at the moment in question can be determined and, for exiting the operating condition, a test can be carried out to determine whether or not the engine torque at that moment exceeds the braking action in effect at the same moment. This leads to a comfortable startup process.

Means can also be provided, furthermore, for signaling clutch actuation by the driver. In this case, the operating mode is recognized only when such clutch actuation is present. In this embodiment, which pertains in particular to hillholding, for safety reasons the signal of a clutch switch is used to sense that a driver is actually present.

In the case of a hydraulic brake system, the brake system has at least one master brake cylinder and one wheel brake cylinder. The means according to the invention can then be designed in such a way that, upon recognition of the preselectable operating mode, at least one solenoid valve installed between the master brake cylinder and at least one wheel brake cylinder is closed by the passage of current through it. To prevent the valve coils from overheating, the current can be sent through the closed solenoid valve in the form of timed pulses.

Additional advantageous embodiment are also described herein.

DRAWING

FIG. 1 shows a schematic diagram of a hydraulic brake system;

FIGS. 2a and 2b shown overall block circuit diagrams of the hillholding and the creep suppression functions;

FIGS. 3a and 3b show the typical braking pressure curves obtained upon actuation of creep suppression;

FIGS. 4a and 4b show the typical braking pressure curves obtained upon actuation of hillholding.

EXEMPLARY EMBODIMENT

The invention is explained below on the basis of the exemplary embodiments described below.

Figure 1:
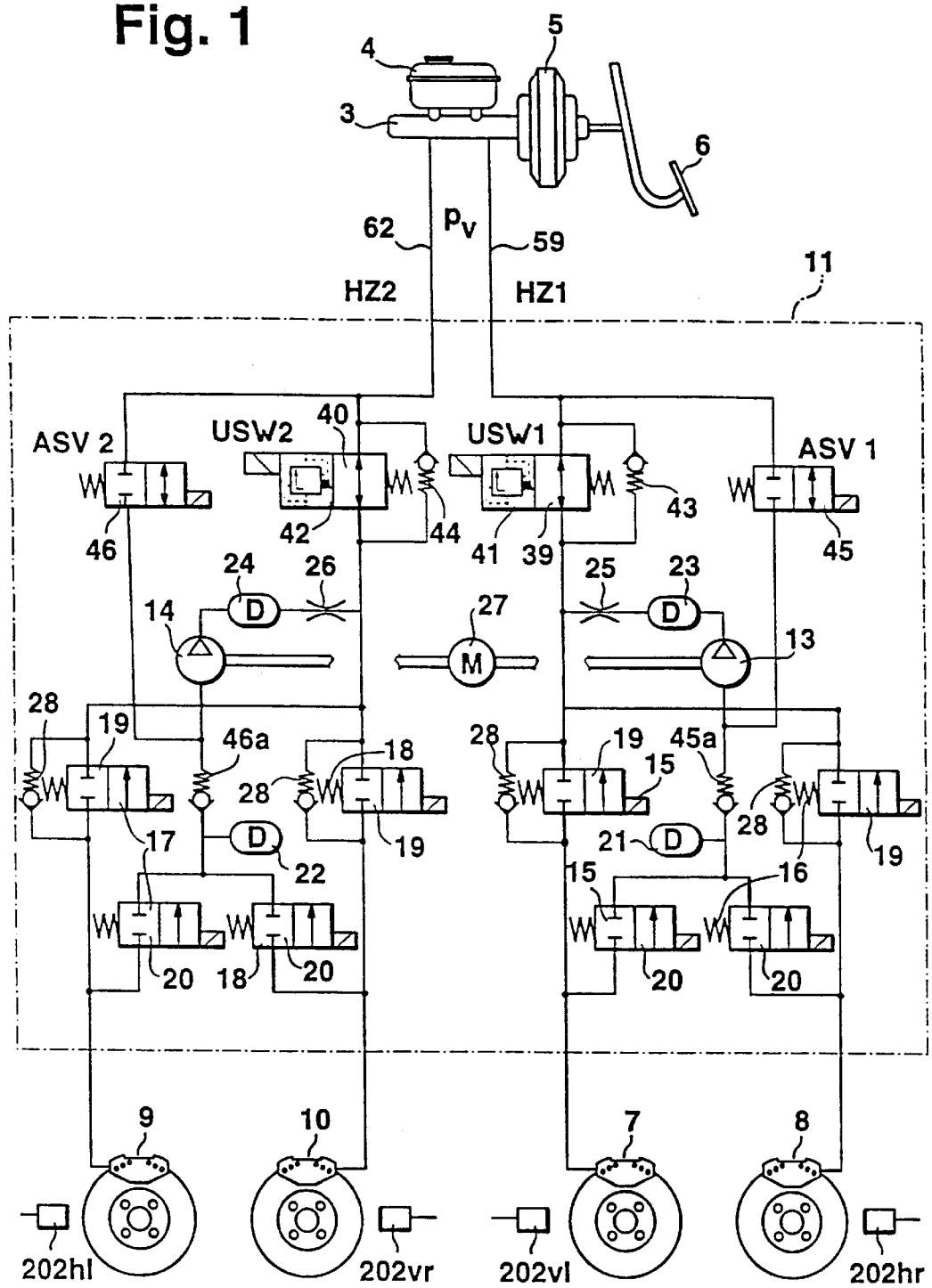

FIG. 1 shows a hydraulic vehicle brake system, which has a two-circuit master brake cylinder 3 with a reservoir 4, with, for example, a pneumatic brake booster 5 and a brake pedal 6. Brake circuit I (HZ1) is assigned to wheel brakes 7 (front left wheel) and 8 (rear right wheel), whereas brake circuit II (HZ2) is assigned to wheel brakes 9 (rear left wheel) and 10 (front right wheel). A wheel slip control device 11 can be seen between master brake cylinder 3 and wheel brakes 7–10.

Master brake cylinder 3 is, for example, designed in a manner known in and of itself and can be actuated by means of brake pedal 6, so that braking pressures are produced in brake circuits I and II. The action which can be exerted by means of brake pedal 6 on master brake cylinder 3 can be amplified by means of brake booster 5. Reservoir 4 supplies master brake cylinder 3 with pressure medium, which, during the normal braking operations, is conducted from master brake cylinder 3 via wheel slip control device 11 to wheel brakes 7–10.

Wheel slip control device 11 serves to limit the wheel slip upon actuation of brake pedal 6 and is designed as a so-called "return" type; it has a return pump 13 for brake circuit I and a return pump 14 for brake circuit II. In addition, wheel slip control device 11 also has its own brake pressure modulation valve assembly 15, 16, 17, 18 for each of wheel brakes 7–10, consisting, for example, in each case of a brake pressure buildup valve 19 and a brake pressure reduction valve 20, as well as a storage chamber 21, 22 for each of the two brake circuits I and II. In addition, a first surge-suppression chamber 23 is provided, for example, for brake circuit I and a second surge-suppression chamber 24 for brake circuit II, as well as a surge-suppression throttle 25 and a surge-suppression throttle 26. A motor 27 is assigned as a drive unit for return pumps 13, 14. Proceeding from wheel brakes 7–10, each of the braking pressure buildup valves 19 assigned to the brakes can be by-passed in the direction of master brake cylinder 3 by means of nonreturn valves 28, which can open in the direction leading toward master brake cylinder 3 when there is a pressure gradient across the associated brake pressure buildup valve 19; such a gradient will be present when, for example, the pressure buildup valve has been switched to a blocking position or when, with the pressure buildup valve in its normal open position, the throttle valve assigned to it has been actuated.

When brake pedal 6 is actuated, it is possible, as a result of the braking pressure $p_{ij}$ produced at wheel brakes 7–10, for a wheel slip control operation to be carried out by means of the individual components of wheel slip control device 11 previously mentioned. It is for this purpose that braking pressure buildup valves 19 are situated between the associated wheel brakes 7–10 and master brake cylinder 3, these valves normally being in the open position, so that the pressure generated in master brake cylinder 3 by the actuation of brake pedal 5 can normally reach wheel brakes 7–10. Braking pressure reduction valves 20 of braking pressure modulation valve assemblies 15, 16; 17, 18, which are also connected to wheel brakes 7–10, are closed in their normal position; when they are actuated, they allow the passage of pressure medium in a throttled manner; they are connected to the input side of return pump 13 of brake circuit I and to the input side of return pump 14 of brake circuit II. Surge suppressors 23, 24 are connected to the output side of return pumps 13, 14. In the direction leading to master brake cylinder 3 and to the respective braking pressure buildup valves 19, surge-suppression chambers 23, 24 are followed by throttles 25, 26.

A control unit (not shown) and the wheels (not shown), which can be braked by means of wheel brakes 7–10, also constitute elements of wheel slip control device 11. Wheel rotational speed sensors 202hl (rear left wheel), 202vr (rear right wheel), 202vl (front left wheel), and 202hr (front right wheel) are assigned to the wheels.

Figure 2A:
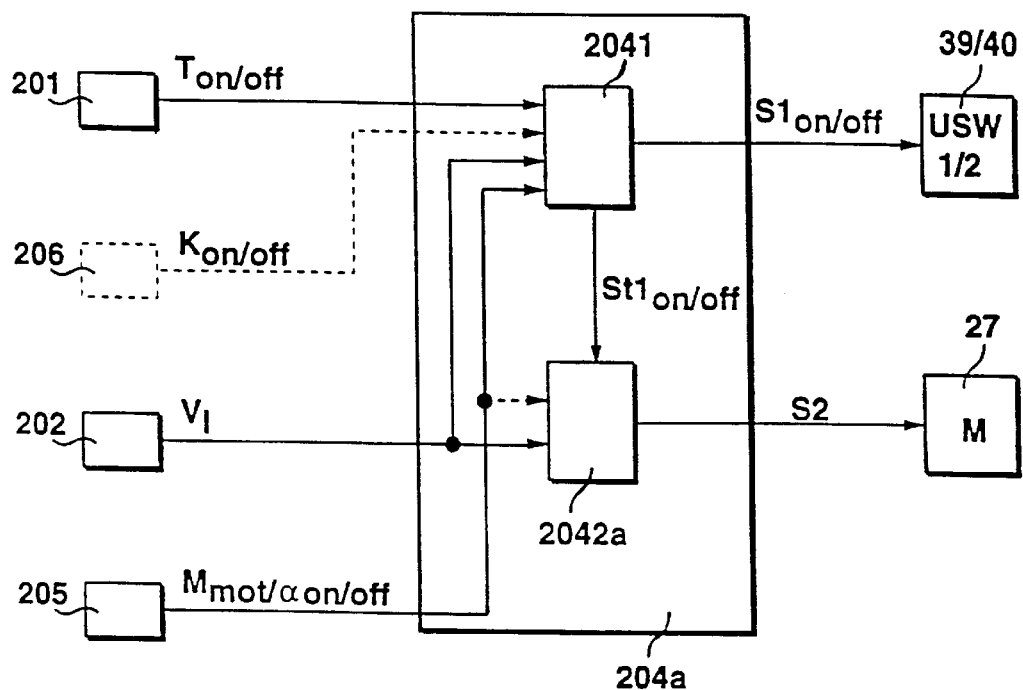
Figure 2B:
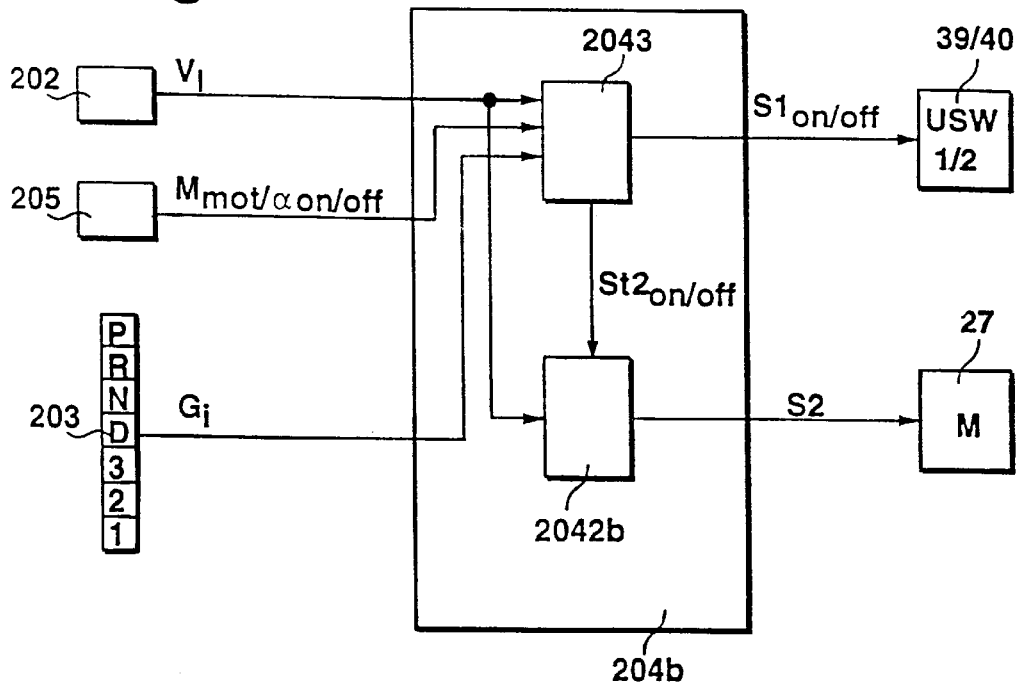

FIGS. 2a and 2b show two embodiments, labeled 204a and 204b (hillholding 204a, creep suppression 204b), of the control unit only insofar as they pertain to the invention.

In control unit 204a, the activation of hillholding is shown by means of block 2041. Block 2042a has as its object the apparatus according to the invention for avoiding unwanted motion of the vehicle.

Output signals $T_{on/off}$ of a pushbutton switch 201, which can be actuated by the driver, are sent to control unit 204a. In addition, the longitudinal velocity $V_1$ of the vehicle, which is determined in block 202 on the basis of sensor signals, is also sent to control unit 204. Longitudinal vehicle velocity $V_1$ can be determined in block 202 by methods known in and of them selves from one or more wheel rotational speed signals (output signals of wheel rotational speed sensors $202_{ij}$ shown in FIG. 1).

The current value of the engine output torque $M_{mot}$ and/or the position $\alpha_{on/off}$ of the gas pedal, which can be actuated by the driver, are also sent from block 205 to control unit 204. Block 205 can be an engine control unit or, in a simple variant, merely a no-load switch connected to the gas pedal.

As an option, it is also possible for output signal $K_{on/off}$ of a clutch switch 206 to be sent to control unit 204a as well. The position of this switch indicates whether, in the case of a manual transmission, the driver is holding down the clutch pedal or not.

In control unit 204a, block 2041 illustrates the activation of hillholding, which maintains the braking pressure $p_{ij}$ acting in wheel brakes ij by changing the switching position of solenoid valves USW1 and/or 2(39, 40 in FIG. 1). Upon actuation of hillholding (status signal $St1_{on}$), the longitudinal velocity $V_1$ of the vehicle is monitored by block 2042a. Motor 27 of return pumps 13, 14 can possibly be put into operation by block 2042a in order to achieve an active increase in the braking pressure (drive signal S2).

The way in which hillholding works is now described on the basis of FIGS. 2a, 3a, and 3b. FIG. 3a shows by way of example the change over time in the longitudinal velocity $V_1$ of the vehicle, whereas FIG. 3b shows the associated change over time in the input pressure $p_v$ or of a wheel brake pressure $p_{ij}$.

Active rotational speed sensors $202_{ij}$ detect when the vehicle is moving. At time $t_2$, the driver actuates brake pedal 6 (FIG. 1) and thus produces a certain input pressure $p_v$ or wheel braking pressure $p_{ij}$ to decelerate the vehicle until it comes to a stop at time $t_2$. If the driver actuates activation switch 201 (signal $T_{on}$) before he releases brake pedal 6 again (time $t_3$), switching valves USW1 39 and USW2 40 of the ABS//IASR hydraulic system are closed (signal $S1_{on}$), and the braking pressure $p_{ij}$ present in wheel brake cylinders ij is locked in, whereas the input pressure $p_v$ decreases to zero by time $t_4$.

If the driver wants to increase the existing braking pressure $p_{ij}$ he can do this at any time by actuating the brake pedal, even though valves USW1, USW2 are closed, because the pressure in brake circuits HZ1, HZ2 can be increased even when USW valves are closed by way of nonreturn valves 43, 44 located at USW valves 39, 40. If, however, the driver reduces the brake input pressure $P_v$, wheel braking pressures $p_{ij}$ continue to be maintained at a constant level because of the closed position of USW valves 39, 40.

If, after hillholding has been actuated (status signal $St1_{on}$), it is determined in block 2042a that longitudinal velocity $V_1$ of the vehicle exceeds a preselectable (small) value (time $t_5$) even though the startup torque $M_{mot}$ is still too low (e.g., as a result of an increase in the load being carried by the vehicle or as a result of leakage in the valves), wheel braking pressure $p_{ij}$ is increased actively by the actuation S2 of motor 27 of return pumps 13/14 until the vehicle velocity has returned to zero again at time $t_6$.

USW valves 39, 40 are not opened again (time $t_7$, signal $S1_{off}$) until the actual startup process occurs. The engine torque $M_{mot}$ generated by the engine, which must exceed a preselectable threshold, or, in the simplest case, the actuation of the gas pedal switch (signal $\alpha_{on}$), serves as the criterion for this. The pressure can also be released during startup by means of braking pressure reduction valves 20 of the ABS/ASR hydraulic system.

As the braking action decreases from time $t_7$ until time $t_8$ as a result of the lowering of the braking pressure, the longitudinal velocity $V_1$ of the vehicle starts to increase shortly after time $t_7$, and the startup process takes place.

For safety reasons, it can be provided as part of hillholding that the signal $K_{on/off}$ of a clutch switch 206 is used to sense the presence of a driver. This means that hillholding can be activated or remain activated only while the clutch is being actuated (signal $K_{on}$).

In control unit 204b, block 2043 shows the activation of creep suppression. Block 2042b has as its object the apparatus according to the invention for avoiding unwanted motion of the vehicle.

Longitudinal vehicle velocity $V_1$, determined by way of sensors in block 202 previously described, is sent to control unit 204b. The current value of the engine output torque $M_{mot}$ and/or the position $\alpha_{on/off}$ of the driver-actuated gas pedal are sent to control unit 204b from previously described block 205. By reading in the driving range signal $G_i$ (position of gear selector 203), it is recognized whether, in the case of an automatic transmission, a driving range has been selected (1, 2, 3, D, R).

In control unit 204b, block 2043 shows the activation of creep suppression, which maintains the braking pressure $p_{ij}$ acting in wheel brakes ij by changing the switch position of solenoid valves USW1 and/or 2 (39, 40 in FIG. 1). By means of block 2042b, longitudinal velocity $V_1$ of the vehicle is monitored after actuation of creep suppression (status signal $St2_{on}$). If desired, motor 27 of return pumps 13, 14 can be put into operation by block 2024b to achieve an active increase in the braking pressure (drive signal S2).

The way in which the creep suppression works is now described on the basis of FIGS. 2b, 4a, and 4b. FIG. 4a shows by way of example the change over time in longitudinal velocity $V_1$ of the vehicle, whereas FIG. 4b shows the associated change over time in input pressure $p_v$ and in a wheel brake pressure $p_{ij}$.

The monitoring 2043 of the active rotational speed sensor signals $V_1$ (sensors $202_{ij}$) at the individual wheels 7–10 recognizes whether the vehicle is moving or whether it is stopped. By reading in the driving range signal $G_i$ (position of gear selector lever 203), it is recognized whether, in the case of an automatic transmission, a driving range has been engaged (1, 2, 3, D, R).

As shown in FIG. 4b, the driver, by actuating brake pedal 6 (FIG. 1) during the period before time $t_1$, specifies an input pressure $p_v$ and thus a wheel braking pressure $p_{ij}$ No later than time $t_1$, the vehicle stops (longitudinal vehicle velocity=0), and a driving range is engaged. This means that, by means of block 2043, switching valves USW1, USW2 of the two brake circuits are closed (signal $S1_{on}$), and thus braking pressure $p_{ij}$ is locked into the wheel brake cylinders.

If, by letting go of brake pedal 6 at time $t_1$, the driver allows braking pressure $p_v$ to fall to zero by time $t_2$, wheel braking pressures $p_{ij}$ remain essentially constant nevertheless. If, by actuating brake pedal 6, the driver increases the braking pressure beyond the locked-in circuit pressure already present (USW1 and USW2 closed), the circuit pressure equalizes itself by way of nonreturn valves 43, 44 of the USW valves at the higher input pressure.

If, at time $t_2$, the vehicle starts to move even though a wheel braking pressure $p_{ij}$ is in effect and exceeds a low threshold value at time $t_4$ (e.g., as a result of an increase in the load being carried by the vehicle or leakage in the valves), this motion is recognized in block 2042b by way of the monitoring of the rotational speed sensor signals (rotational speed sensors $202_{ij}$). At time $t_4$, then, the braking pressure $p_{ij}$ is increased by the actuation (signal S2) of return pump 13/14 by the operation of pump motor 27 until the vehicle has come to a stop again at time $t_5$.

Creep suppression ends at time $t_6$, as soon as the driver actuates the gas pedal or the engine torque exceeds a certain threshold value (block 205). For this purpose, switching valves USW1, USW2 are opened again (signal $S2_{off}$). The pressure can also be reduced in this case by way of braking pressure reduction valves 20 of the ABS/ASR hydraulic system.

If the braking action decreases starting at time $t_6$ and lasting until time $t_7$ as a result of the lowering of the braking pressure, the longitudinal velocity $V_1$ of the vehicle increases, and thus the startup process takes place shortly after time $t_6$.

It should also be mentioned that, as an advantageous embodiment in the case of hillholding and creep suppression, it is possible, as a way of achieving a safety pressure offset, for the pressure to be increased actively by the actuation of pump motor 27 and through the actuation of valves USW1, USW2 the very first time hillholding and the creep suppression are activated.

It can also be provided that, when USW valves 39, 40 are closed, the valve current is reduced by applying it in the form of timed pulses, for example, so that the thermal load on the valve coils can be reduced.

If the input pressure $p_v$ is known (e.g., by the sensing of the pressure in appropriate brake systems), this value can also be used as one of the activation or deactivation conditions.

In the case of creep suppression, it is then possible to use:
activation: $p_v > p_{v,on}$
deactivation: $p_v < p_{v,off}$
In the case of hillholding, it is possible to use:
activation: $p_v > p_{v,on}$
deactivation: $M_{mot} > $ braking torque $M_{br}$,
the instantaneous braking torque being derived from the sensed pressure.

What is claimed is:

1. A system for controlling braking effect in a motor vehicle being operated by a driver, said system comprising:
   means for determining longitudinal vehicle velocity ($V_1$) of the vehicle;
   means recognizing an operating mode wherein, at least, said longitudinal vehicle velocity ($V_1$) of the vehicle is detected to be zero;
   means for adjusting the braking effect of the vehicle to a specific value when said operating mode is recognized;
   means for comparing said longitudinal vehicle velocity ($V_1$) with a threshold during said operating mode;
   means for increasing the braking effect of the vehicle (above the specific value) independently of driver operation when said longitudinal vehicle velocity ($V_1$) exceeds said threshold during said operating mode.

2. The system according to claim 1, wherein
the means for recognizing and the means for adjusting recognize the operating mode when, in addition to the longitudinal vehicle velocity ($V_1$) being zero, a switching means adapted to be actuated by the driver of the vehicle, is in a preselectable position corresponding to a desired hillholding function of the vehicle.

3. The system according to claim 2, wherein
the operating mode is recognized when the braking action ($p_v$) initiated by the driver exceeds a preselectable first value ($p_{v,on}$).

4. The system according to claim 1, wherein the operating mode is recognized when the braking action ($p_v$) initiated by the driver exceeds a preselectable first value ($p_{v,on}$).

5. The system according to claim 1, wherein
the means for recognizing and the means for adjusting all configured so that, upon recognition of the operating mode, the braking action ($p_v$) currently set by the driver is kept substantially constant.

6. The system according to claim 1, wherein
the means for recognizing and the means for adjusting are configured so that, upon recognition of the operating mode, the braking action ($p_v$) currently set by the driver is increased by a preselectable second value.

7. The system according to claim 1, wherein
the means for recognizing and the means for adjusting exit the operating mode responsive to detection of a signal ($M_{mot}$, $\alpha$) representing the engine torque exceeding a preselectable third value.

8. The system according to claim 7, wherein
the means for recognizing and the means for adjusting exit the operating mode responsive to detection of braking action ($p_v$) initiated by the driver being below a preselectable fourth value ($p_{v,off}$).

9. The system according to claim 7, wherein
the third value ($M_{br}$) is preselected as a function of a value representing the instantaneous braking action.

10. The system according to claim 7, wherein
the means for recognizing and the means for adjusting exits the operating mode responsive to detection of braking action ($p_v$) initiated by the driver being below a preselectable value ($p_{v,off}$).

11. The system according to claim 1, wherein
said means for recognizing and the means for adjusting are provided with the ability for detecting clutch actuation performed by the driver, and wherein said means for recognizing and the means for adjusting recognize the operating mode only when said clutch actuation is present.

12. The system according to claim 1, wherein
the vehicle has a brake system having at least one master brake cylinder and one wheel brake cylinder;
the means for recognizing and the means for adjusting, upon the recognition of the preselectable operating mode, close at least one solenoid valve installed between the master brake cylinder and at least one wheel brake cylinder by the passage of a current there through; and
the current being applied in the form of timed pulses while the solenoid valve is closed.

13. The system according to claim 1, wherein
the vehicle has a transmission which can change gear ratios automatically and which has a driving range, and the means for recognizing and the means for adjusting recognize the operating mode when, in addition to the longitudinal vehicle velocity ($V_1$) being zero, said means recognizes that the driving range has been selected, whereby a creep suppression function is provided.

14. The system according to claim 1, wherein
the means for recognizing and the means for adjusting exits the operating condition responsive to detection of the driver depressing the gas pedal.

* * * * *